United States Patent
Chung et al.

(10) Patent No.: US 7,750,986 B2
(45) Date of Patent: Jul. 6, 2010

(54) LIQUID CRYSTAL DISPLAY APPARATUS

(75) Inventors: Chae-Woo Chung, Cheonan-si (KR);
Young-Goo Song, Suwon-si (KR);
Jeong-Ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 529 days.

(21) Appl. No.: 11/677,310

(22) Filed: Feb. 21, 2007

(65) Prior Publication Data

US 2007/0195214 A1 Aug. 23, 2007

(30) Foreign Application Priority Data

Feb. 23, 2006 (KR) .................. 10-2006-0017722

(51) Int. Cl.
*G02F 1/1343* (2006.01)
(52) U.S. Cl. .......................... 349/39; 349/38
(58) Field of Classification Search .......... 349/38, 349/39

See application file for complete search history.

(56) References Cited

U.S. PATENT DOCUMENTS

| | | | |
|---|---|---|---|
| 6,839,112 B2 * | 1/2005 | Chien et al. | 349/129 |
| 7,227,605 B2 * | 6/2007 | Kim et al. | 349/129 |
| 7,362,390 B2 * | 4/2008 | Lai | 349/39 |
| 7,483,090 B2 * | 1/2009 | Shin et al. | 349/38 |
| 2004/0233343 A1 * | 11/2004 | Baek | 349/38 |
| 2004/0263756 A1 * | 12/2004 | Tak et al. | 349/145 |
| 2009/0128750 A1 * | 5/2009 | Kim et al. | 349/96 |

FOREIGN PATENT DOCUMENTS

EP 1 605 511 12/2005

* cited by examiner

*Primary Examiner*—Uyen-Chau N Le
*Assistant Examiner*—Chris H Chu
(74) *Attorney, Agent, or Firm*—H.C. Park & Associates, PLC

(57) ABSTRACT

A liquid crystal display (LCD) apparatus includes an upper substrate having an upper director, a lower substrate having a lower director, and a liquid crystal layer interposed between the upper substrate and the lower substrate. The upper director and the lower director aligning liquid crystals included in a liquid crystal layer to widen a viewing angle of the LCD apparatus. A storage electrode having a shape corresponding to the upper director and the lower director is arranged on the lower substrate so that the liquid crystals are rapidly aligned in a predetermined angle to increase an operating speed of the LCD apparatus.

18 Claims, 10 Drawing Sheets

LIQUID CRYSTAL DISPLAY APPARATUS

CROSS REFERENCE TO RELATED APPLICATION

This application claims the benefit of and priority to Korean Patent Application No. 2006-17722 filed on Feb. 23, 2006, which is hereby incorporated by reference for all purposes as if fully set forth herein.

BACKGROUND OF THE INVENTION

1. Field of the Invention

The present invention relates to a liquid crystal display (LCD) apparatus. More particularly, the present invention relates to an LCD apparatus having a wide viewing angle and an improved operation speed.

2. Discussion of the Background

An LCD apparatus uses liquid crystals in an intermediate state between a liquid state and a solid state. The LCD apparatus has two substrates, and the liquid crystals are arranged between the two substrates with a predetermined alignment. Since the liquid crystals have an anisotropic dielectric constant, the alignment of the liquid crystals is changed when an electric field is applied to the liquid crystals. In addition, since the liquid crystals have an anisotropic refractive index, light transmittance of the LCD apparatus may vary according to the alignment of the liquid crystals. The LCD apparatus applies an electric field between the two substrates such that the liquid crystals have a light transmittance corresponding to display information transmitted as data signals. Thus, the alignment of the liquid crystals varies according to the applied electric field, thereby displaying images on the LCD apparatus.

However, a viewing angle of the LCD apparatus may be narrowed due to the anisotropic refractive index. The viewing angle represents the range of an angle allowing a user to properly view a displayed image. Since an image displayed on the LCD apparatus may be distorted when viewed from a lateral side of the LCD apparatus, the LCD apparatus may have a viewing angle narrower than that of other display devices. The narrowed viewing angle may result from alignment of the liquid crystals with respect to the front surface of the LCD apparatus.

Recently, techniques have been developed to solve the problem of the narrowed viewing angle. However, these techniques may reduce the operating speed of the LCD apparatus.

SUMMARY OF THE INVENTION

This invention provides an LCD apparatus with an improved operation speed and a widened viewing angle.

Additional features of the invention will be set forth in the description which follows, and in part will be apparent from the description, or may be learned by practice of the invention.

The present invention discloses a liquid crystal display apparatus including an upper substrate and a lower substrate opposing each other, a liquid crystal layer arranged between the upper substrate and the lower substrate, a storage capacitor arranged on the lower substrate and comprising a first storage electrode and a second storage electrode, a pixel electrode arranged on the second storage electrode and comprising a lower director having a first lower director coupled with a second lower director, and a common electrode arranged on the upper substrate and comprising an upper director having a first upper director coupled with a second upper director. Further, the second storage electrode is arranged symmetrically about a virtual line passing through a first point defined where the first lower director meets with the second lower director and a second point defined where the first upper director meets with the second upper director, and the second storage electrode extends substantially parallel to the first lower director and the second lower director.

The present invention also discloses a liquid crystal display apparatus including an upper substrate and a lower substrate opposing each other, a data line crossing with a gate line to define a pixel area, a liquid crystal layer arranged between the upper substrate and the lower substrate, the liquid crystal layer including a plurality of liquid crystals, a storage capacitor arranged on the lower substrate and comprising a first storage electrode and a second storage electrode, a pixel electrode arranged in the pixel area and including a lower director, and a common electrode arranged on the upper substrate and including an upper director. Further, the pixel electrode includes an angled surface corresponding to an edge surface of the storage capacitor, and liquid crystals are aligned substantially perpendicular to the angled region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
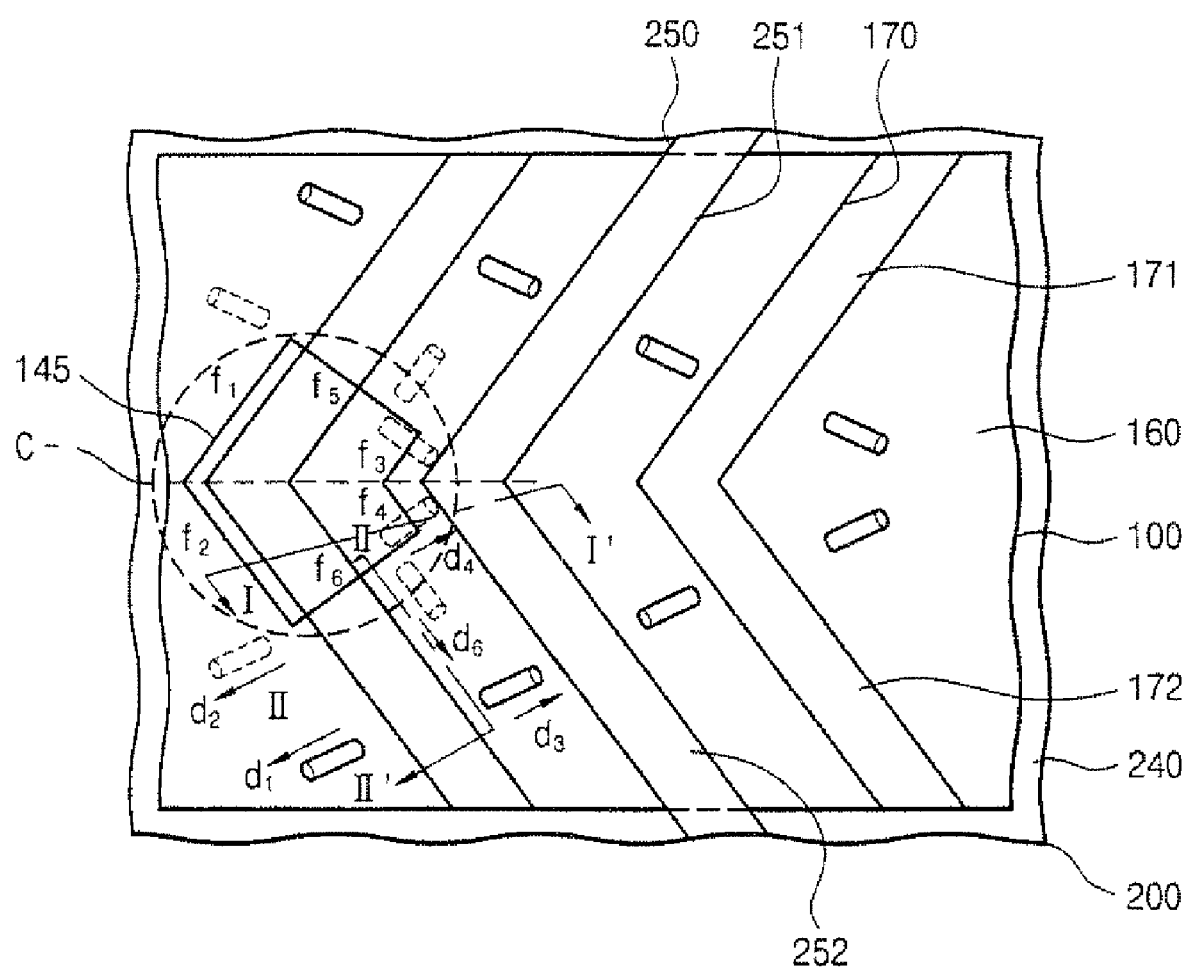
FIG. 1 shows a plan view of an LCD apparatus according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

When an element or layer is referred to as being "on", "connected to" or "coupled with" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2A:
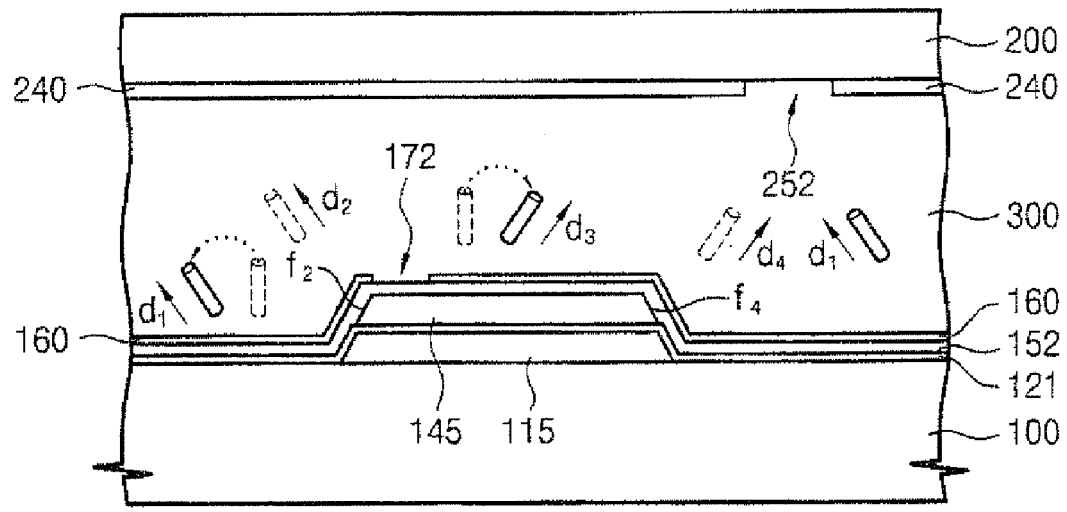
FIG. 2A shows a sectional view taken along line I-I' shown in FIG. 1.
Figure 2B:
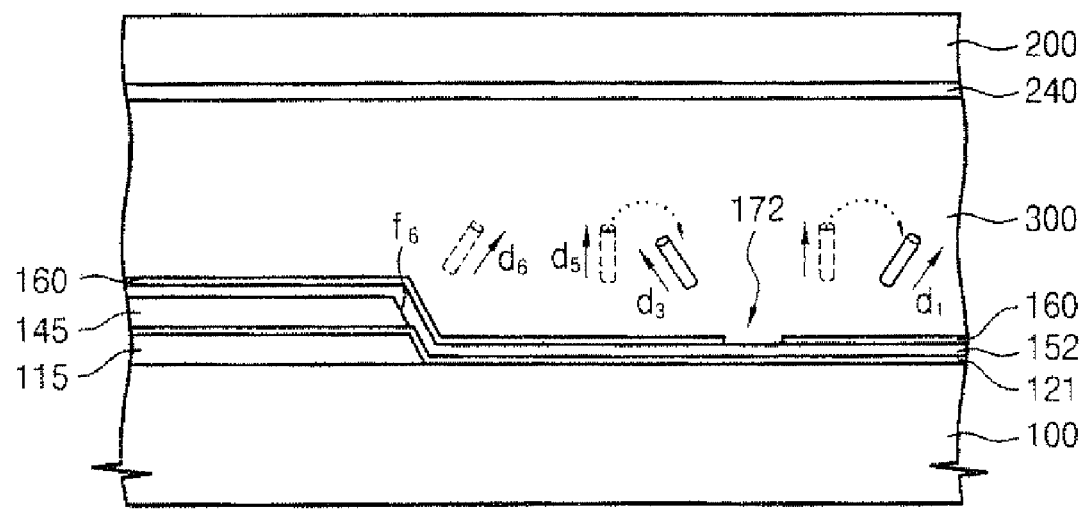
FIG. 2B shows a sectional view taken along line II-II' shown in FIG. 1.

FIG. 1 shows a plan view of an LCD apparatus according to an exemplary embodiment of the present invention. FIG. 2A shows a sectional view taken along line I-I' shown in FIG. 1. FIG. 2B shows a sectional view taken along line II-II' shown in FIG. 1.

Referring to FIG. 1, FIG. 2A, and FIG. 2B, the LCD apparatus includes a lower substrate 100, an upper substrate 200, and a liquid crystal layer 300 including liquid crystals interposed between the lower substrate 100 and the upper substrate 200. The upper substrate 200 may include a common electrode 240, and the lower substrate 100 may include a plurality of pixel electrodes 160. The common electrode 240 may be arranged to oppose the plurality of pixel electrodes 160. While driving the LCD apparatus, a common voltage may be applied to the common electrode 240. One of the plurality of pixel electrodes 160 may be individually arranged in a pixel area defined in the lower substrate 100. While driving the LCD apparatus, a data voltage may be applied to the pixel electrode 160. Due to the potential difference between the voltage applied to the common electrode 240 and a data voltage applied to a pixel electrode 160, an electric field may be generated between the upper substrate 200 and the lower substrate 100. This electric field is applied to the liquid crystals included in the liquid crystal layer 300. Liquid crystals are shown in the Figures as dotted lines when an electric field is not applied between the upper substrate 200 and the lower substrate 100, and shown as solid lines when the electric field is applied between the upper substrate 200 and the lower substrate 100.

The common electrode 240 may include an upper director 250, and the pixel electrode 160 may include a lower director 170.

The upper director 250 may include a first upper director 251 and a second upper director 252, which may be arranged symmetrically about an axis. The first upper director 251 and the second upper director 252 may be arranged to extend in different directions and meet at a predetermined region. Thus, the upper director 250 may be angled at a region where the first upper director 251 meets with the second upper director 252. As shown in the exemplary embodiment in FIG. 1, an angle of 90° may be formed between the first upper director 251 and the second upper director 252.

The lower director 170 may include a first lower director 171 and a second lower director 172, which may be arranged symmetrically about an axis. The first lower director 171 and the second lower director 172 may be spaced apart from the first upper director 251 and the second upper director 252 by a predetermined distance such that the first lower director 171 and the second lower director 172 do not overlap with the first upper director 251 and the second upper director 252. The first lower director 171 and the second lower director 172 may be arranged to extend in different directions and meet at a predetermined region. Thus, the lower director 170 may be angled at a region where the first lower director 171 meets with the second lower director 172. As shown in the exemplary embodiment in FIG. 1, an angle of 90° may be formed between the first lower director 171 and the second lower director 172. As shown in the exemplary embodiment in FIG. 1, the first lower director 171 may be arranged to be substantially parallel to the first upper director 251. As also shown in the exemplary embodiment in FIG. 1, the second lower director 172 may be arranged to be substantially parallel to the second upper director 252.

The upper director 250 may include a first cutting portion formed by cutting the common electrode 240. The lower director 170 may include a second cutting portion formed by cutting the pixel electrode 160. The first cutting portion in the upper director 250 and the second cutting portion in the lower director 170 may influence the direction of an electric field applied to the liquid crystals in the liquid crystal layer 300.

For example, when an electric field is applied to the liquid crystals, the electric field may be aligned in a vertical direction between the common electrode 240 and the pixel electrode 160. However, since the common voltage is not applied to the first cutting portion in the upper director 250, and the data voltage is not applied to the second cutting portion in the lower director 170, the direction of the electric field between the common electrode 240 and the pixel electrode 160 may be changed at areas adjacent to the first cutting portion and the second cutting portion. That is, the direction of the electric field may be tilted at an angle with respect to the vertical direction between the common electrode 240 and the pixel electrode 160.

In this manner, the upper director 250 and the lower director 170 may influence the alignment of the liquid crystals when the electric field is applied to the liquid crystals. In addition, since the first lower director 171 may be arranged symmetrical to the second lower director 172 and the first upper director 251 may be arranged symmetrical to the second upper director 252, the alignment of the liquid crystals influenced by the first lower director 171 and the first upper director 251 may be symmetrical to the alignment of the liquid crystals influenced by the second lower director 172 and the second upper director 252. If areas are formed with liquid crystals aligned in different directions, optical properties may be improved to widen a viewing angle of the LCD apparatus.

A storage capacitor C may be arranged on the lower substrate 100 between the lower substrate 100 and the pixel electrode 160. The storage capacitor C may include a first storage electrode 115 and a second storage electrode 145, which may face the first storage electrode 115. The storage capacitor C may be electrically coupled with the pixel electrode 160 and may store a voltage equivalent to the data voltage.

The second storage electrode 145 may extend substantially parallel to the first lower director 171 and the second lower director 172. The second storage electrode 145 may be arranged symmetrically about a virtual line, shown as a dashed line on FIG. 1, that extends through a first point defined on a plan view of the pixel area where the first lower director 171 meets with the second lower director 172, and a second point defined on a plan view of the pixel area where the first upper director 251 meets with the second lower director 252. The second storage electrode 145 may be arranged on the lower substrate 100 to substantially correspond to the first point where the first lower director 171 meets with the second lower director 172.

In more detail, the second storage electrode 145 may include a first surface $f_1$, a second surface $f_2$, a third surface $f_3$, a fourth surface $f_4$, a fifth surface $f_5$ and a sixth surface $f_6$. The first surface $f_1$ may be arranged substantially parallel to the first lower director 171. The second surface $f_2$ may be arranged substantially parallel to the second lower director 172. The third surface $f_3$ may be arranged substantially parallel to the first upper director 251. The fourth surface $f_4$ may be arranged substantially parallel to the second upper director 252. The fifth surface $f_5$ may couple the first surface $f_1$ with the third surface $f_3$, and the sixth surface $f_6$ may couple the second surface $f_2$ with the fourth surface $f_4$. The surfaces of the second storage electrode 145 may influence an alignment direction of the liquid crystals in the liquid crystal layer 300, and this will be described below.

Referring to FIG. 2A, the first storage electrode 115, the second storage electrode 145, and the pixel electrode 160 may be arranged on the lower substrate 100. A first insulating layer 121 may be arranged between the first storage electrode 115 and the second storage electrode 145, and a second insulating layer 152 may be arranged between the second storage electrode 145 and the pixel electrode 160. The common electrode 240 may be arranged on the upper substrate 200. The first cutting portion corresponding to the second upper director 252 may be arranged in association with the common electrode 240, and the second cutting portion corresponding to the second lower director 172 may be arranged in association with the pixel electrode 160.

When an electric field is not applied to liquid crystals in the liquid crystal layer 300, liquid crystals may be aligned vertically between the upper substrate 200 and the lower substrate 100. However, liquid crystals adjacent to an area in which the storage capacitor C is arranged may be tilted with respect to the upper substrate 200 and the lower substrate 100 even if the electric field is not applied to the liquid crystals. In an area adjacent to edge surfaces of the storage capacitor C, the surface of the pixel electrode 160 may have an angled surface rather than a planar surface due to the arrangement of the first storage electrodes 115 and the second storage electrode 145. The liquid crystals may be aligned substantially perpendicular to the angled surface of the stepped portion due to the stored voltage in the storage capacitor C and thus may be tilted at an angle with respect to the upper substrate 200 and the lower substrate 100.

However, since the second surface $f_2$ may be arranged substantially parallel to the second lower director 172, an alignment direction $d_1$ of the liquid crystals located proximate to the second lower director 172 when an electric field is applied may be identical or substantially similar to an alignment direction $d_2$ of the liquid crystals located proximate to second surface $f_2$ This principle may be similarly employed for alignment of liquid crystals located proximate to the first surface $f_1$ and the first lower director 171.

Similarly, since the fourth surface $f_4$ may be substantially parallel to the second upper director 252, an alignment direction $d_4$ of the liquid crystals located proximate to the fourth surface $f_4$ may be identical or substantially similar to an alignment direction $d_3$ of the liquid crystals located proximate to the second upper director 252 when an electric field is applied. This principle may be similarly employed for alignment of liquid crystals located proximate to the third surface $f_3$ and the first upper director 251.

Accordingly, when an electric field is applied, liquid crystals in the liquid crystal layer 300 and located proximate to the first surface $f_1$ and to the fourth surface $f_4$ have already been arranged in a desired alignment direction. As a result, liquid crystals can be aligned more quickly, thereby improving an operational speed of the LCD apparatus.

Referring again to FIG. 1, the second lower director 172 may be arranged between the second upper director 252 and the second surface $f_2$ and may be adjacent to the second surface $f_2$. Hereinafter, description will be made in relation to this location relationship.

Similar to the second lower director 172, the second surface $f_2$ of the second storage electrode 145 may influence an alignment of liquid crystals. In order to more stably control the alignment of liquid crystals, and more specifically to more stably control the alignment of liquid crystals in a region proximate to the first point where the first lower director 171 meets with the second lower director 172, influences on the alignment of liquid crystals arranged proximate to the first point may be well-defined. When an electric field is applied, the first lower director 171 and the second lower director 172 may align liquid crystals in different directions. However, liquid crystals adjacent to the first lower director 171 and the second lower director 172 may be aligned randomly under the influence of both the first lower director 171 and the second lower director 172.

Thus, the second surface $f_2$ may be arranged such that the second surface $f_2$ is closer to the second lower director 172 than to the second upper director 252. Similarly, the first surface $f_1$ may be arranged such that the first surface $f_1$ is closer to the first lower director 171 than to the first upper director 251. The second surface $f_2$ may overlap with the second lower director 172, and the first surface $f_1$ may overlap with the first lower director 171. Thus, before an electric field is applied, some liquid crystals arranged proximate to the first point may also be arranged substantially adjacent to the second surface $f_2$ and tilted in an alignment $d_2$ substantially orthogonal to the second surface $f_2$. Similarly, some liquid crystals arranged proximate to the first point may be arranged substantially adjacent to the first surface $f_1$ and tilted in an alignment substantially orthogonal to the first surface $f_1$. Therefore, when the electric field is applied during the driving of the LCD apparatus, these liquid crystals arranged proximate to the first point may be pre-tilted in a predetermined alignment. This may prevent the hindrance of liquid crystals from aligning into the predetermined alignment. Additionally, pre-tilting the liquid crystals may increase an operation time of the LCD apparatus.

As shown in FIG. 2A, liquid crystals arranged on the left side or the right sides of the second lower director 172 may have different alignment directions such as $d_1$ and $d_3$. However, an alignment $d_2$ of liquid crystals located proximate to the second surface $f_2$ of the second storage electrode 145 may correspond to the alignment $d_1$ of the liquid crystals at the left side of the second lower director 172 when an electric field is applied. Accordingly, in order to for these alignment directions to correspond with each other, the second surface $f_2$ may be located along the left side of the second lower director 172. According to this location relationship, the second lower director 172 may be located between the second upper director 252 and the second surface $f_2$ when viewed in a plan view. This structural arrangement may be similarly employed for the first surface $f_1$, the first lower director 171, and the first upper director 251.

For the substantially same reason for locating the second surface $f_2$ substantially adjacent to the second lower director 172 and for locating the first surface $f_1$ substantially adjacent to the first lower director 171, the fourth surface $f_4$ of the second storage electrode 145 may be arranged substantially adjacent to the second upper director 252. Specifically, in order to more stably control the alignment of liquid crystals in a region proximate to the second point where the first upper director 251 meets with the second upper director 252, influences on the alignment of liquid crystals arranged proximate to the second point may be well-defined. When an electric field is applied, the first upper director 251 and the second upper director 252 may align liquid crystals in different directions. However, liquid crystals adjacent to the first upper director 251 and the second upper director 252 may be aligned randomly under the influence of both the first upper director 251 and the second upper director 252.

Thus, the fourth surface $f_4$ may be arranged such that the fourth surface $f_4$ is closer to the second upper director 252 than to the second lower director 172. Thus, before an electric field is applied, some liquid crystals arranged proximate to the second point may also be arranged substantially adjacent to the fourth surface $f_4$ and tilted in an alignment $d_4$ substantially orthogonal to the fourth surface $f_4$. Similarly, other liquid crystals arranged proximate to the second point may be arranged substantially adjacent to the third surface $f_3$ and tilted in an alignment substantially orthogonal to the third surface $f_3$. Therefore, when the electric field is applied during the driving of the LCD apparatus, these liquid crystals arranged proximate to the first point may be pre-tilted in a predetermined alignment. This may prevent the hindrance of liquid crystals from aligning into the predetermined alignment. Additionally, pre-tilting the liquid crystals may increase an operation time of the LCD apparatus.

In addition, the fourth surface $f_4$ may be arranged between the second upper director 252 and the second lower director 172. Since an alignment $d_4$ of liquid crystals located proximate to the fourth surface $f_4$ may correspond to the alignment $d_3$ of liquid crystals at a left side of the second upper director 252 when an electric field is applied, the fourth surface $f_4$ may be arranged along the left side of the second upper director 252 in order to match the alignment directions $d_4$ and $d_3$ with each other. According to this location relationship, the fourth surface $f_4$ may be arranged between the second lower director 172 and the second upper director 252 when viewed in a plan view. This principle may be similarly employed for the third surface $f_3$, the first lower director 171, and the first upper director 251.

Liquid crystals may also be tilted at a predetermined angle when arranged proximate to the sixth surface $f_6$ of the second storage electrode 145 even if an electric field is not applied. The sixth surface $f_6$ may be arranged substantially orthogonal to the first surface $f_4$ and the second surface $f_2$. In addition, the sixth surface may be arranged substantially orthogonal to cross with the second upper and lower directors 252 and 172. Accordingly, the alignment direction $d_6$ of liquid crystals arranged proximate to the sixth surface $f_6$ may differ from the alignment directions $d_1$ and $d_3$ of liquid crystals arranged proximate to the second lower director 172 when the electric field is applied.

Referring to FIG. 2B, when an electric field is not applied, liquid crystals at an area adjacent to the storage electrode 145 may be aligned in a direction $d_6$ (hereinafter referred to as a first direction), which is tilted to an angle due to proximity of the sixth surface $f_6$. As distance between the liquid crystals and the sixth surface $f_6$ increases, the alignment of the liquid crystals may change gradually, to a direction $d_5$ (hereinafter referred to as a second direction), which is vertical between the upper substrate 200 and the lower substrate 100. When an electric field is applied to the liquid crystals, the liquid crystals may be aligned in direction $d_1$ (hereinafter referred to as the third direction) and direction $d_3$ (hereinafter referred to as the fourth direction), which may each be tilted away from the second lower director 172.

Since the sixth surface $f_6$ arranged substantially orthogonal to the fourth surface $f_4$ and the second surface $f_2$, the first direction $d_6$ and the second direction $d_5$ may be aligned in the same plane. Since the liquid crystals may be aligned in the second direction $d_5$ and the first direction $d_6$ in the same plane at the sixth surface $f_6$ and at an area adjacent to the sixth surface $f_6$, liquid crystals may not exist in a twisted state, which otherwise may occur when alignment directions of the liquid crystals are not in the same plane.

When an electric field is applied in a conventional LDC apparatus, some liquid crystals initially aligned in a twisted state may be aligned in the third direction $d_1$, while some liquid crystals initially aligned in the twisted state may be aligned in the fourth direction $d_3$. Time is required to change the alignment direction of the liquid crystals from the twisted state into the third direction $d_1$ or the fourth direction $d_3$. Therefore, the operational speed of the LCD apparatus may be lowered. Further, since the liquid crystals shift into different alignments with the application of the electric field, the liquid crystals may impede each other from shifting alignment. Thus, some liquid crystals may not be able to be shift into the desired alignment so a texture on the conventional LCD apparatus's image display may occur.

According to the present invention, since the sixth surface $f_6$ is arranged substantially orthogonal to the fourth surface $f_4$ and the second surface $f_2$, liquid crystals may not be aligned initially in a twisted state, so the texture is prevented and the operational speed increases. In practice, the sixth surface $f_6$ may be formed at an angle of 90°±θ, where θ denotes a small angle within tolerance ranges, to the fourth surface $f_4$ and the second surface $f_2$. This structural arrangement may be similarly employed for the fifth surface $f_5$ in relation to the first surface $f_1$ and the third surface $f_3$.

Since a step may be disposed along a surface of the pixel electrode 160 due to the size, shape, or arrangement of the first storage electrode 115 in addition to the second storage electrode 145, the first storage electrode 115 may also influence the alignment of the liquid crystals when an electric field is not applied.

The first storage electrode 115 may be arranged in the same shape as that of the second storage electrode 145 and vertically overlapped by the second storage electrode 145. In this case, the influence of the first storage electrode 115 on the alignment of the liquid crystals may be added to that of the second storage electrode 145, so that the texture is prevented, and the operational speed is improved in the LCD apparatus.

Alternatively, the first storage electrode 115 may be entirely covered by the second storage electrode 145. Since a step in the liquid crystal layer may only be adjacent to the second storage electrode 145, the first storage electrode 115 may exert only a small influence or may not exert an influence upon the alignment of the liquid crystals. In this case, only the effect of the second storage electrode 145 may influence the alignment of the liquid crystals to prevent texturing, and to improve the operational speed of the LCD apparatus.

Figure 3A:
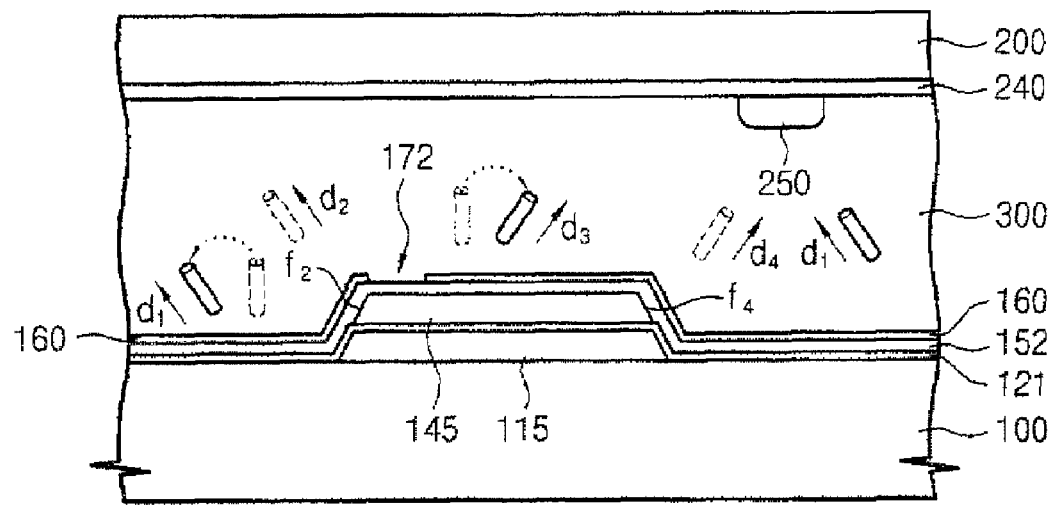
FIG. 3A shows a sectional view taken along line I-I' shown in FIG. 1, according to another exemplary embodiment of the present invention.
Figure 3B:
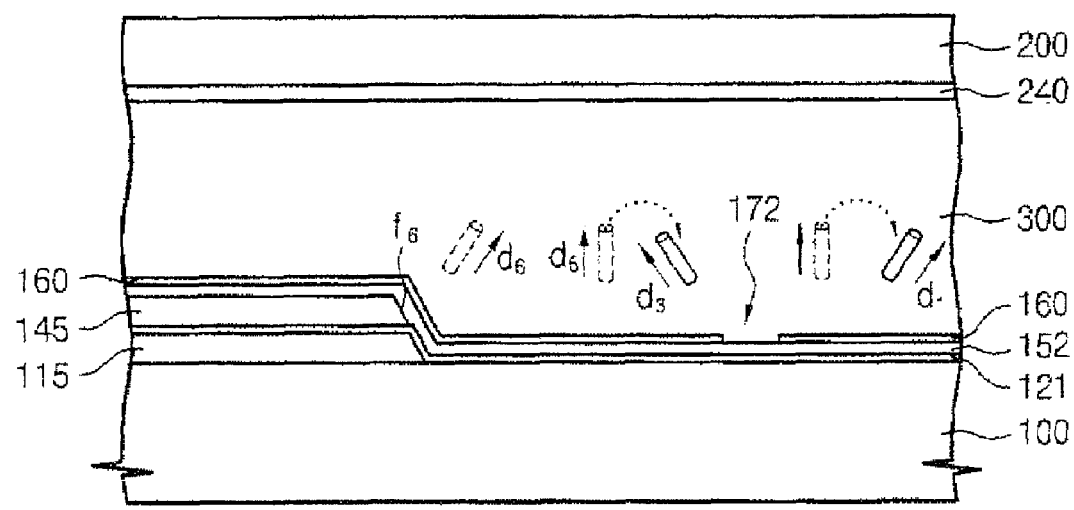
FIG. 3B shows a sectional view taken along line II-II' shown in FIG. 1, according to another exemplary embodiment of the present invention.

FIG. 3A shows a sectional view taken along line I-I' shown in FIG. 1 according to another exemplary embodiment of the present invention. FIG. 3B shows a sectional view taken along line II-II' shown in FIG. 1, according to another exemplary embodiment of the present invention.

Referring to FIG. 3A and FIG. 3B, the upper director 250 may include a protrusion protruding from a predetermined area of the common electrode 240, and the lower director 170 may include the second cutting portion in the pixel electrode 160. The protrusion may include an insulating material so an electric field is not applied to the protrusion. Accordingly, the protrusion may yield the same effect as that of the first cutting portion shown in FIG. 2A such that a plurality of areas in which the liquid crystals are aligned in different directions are formed when an electric field is applied to the common electrode 240. As a result, a viewing angle of the LCD apparatus may be widened.

Similarly to the upper director 250, the lower director 170 may be formed as a protrusion. However, manufacturing the lower substrate 100 may include patterning a conductive layer to form the pixel electrode 160. Therefore, the second cutting portion may be formed substantially simultaneously with the pixel electrode 160 during the patterning process without requiring an additional process. Therefore, the second cutting portion may be employed in the lower substrate 100 instead of the protrusion, and may be arranged in a portion of the pixel electrode 160 or as an external contour of the pixel electrode 160.

Figure 4:
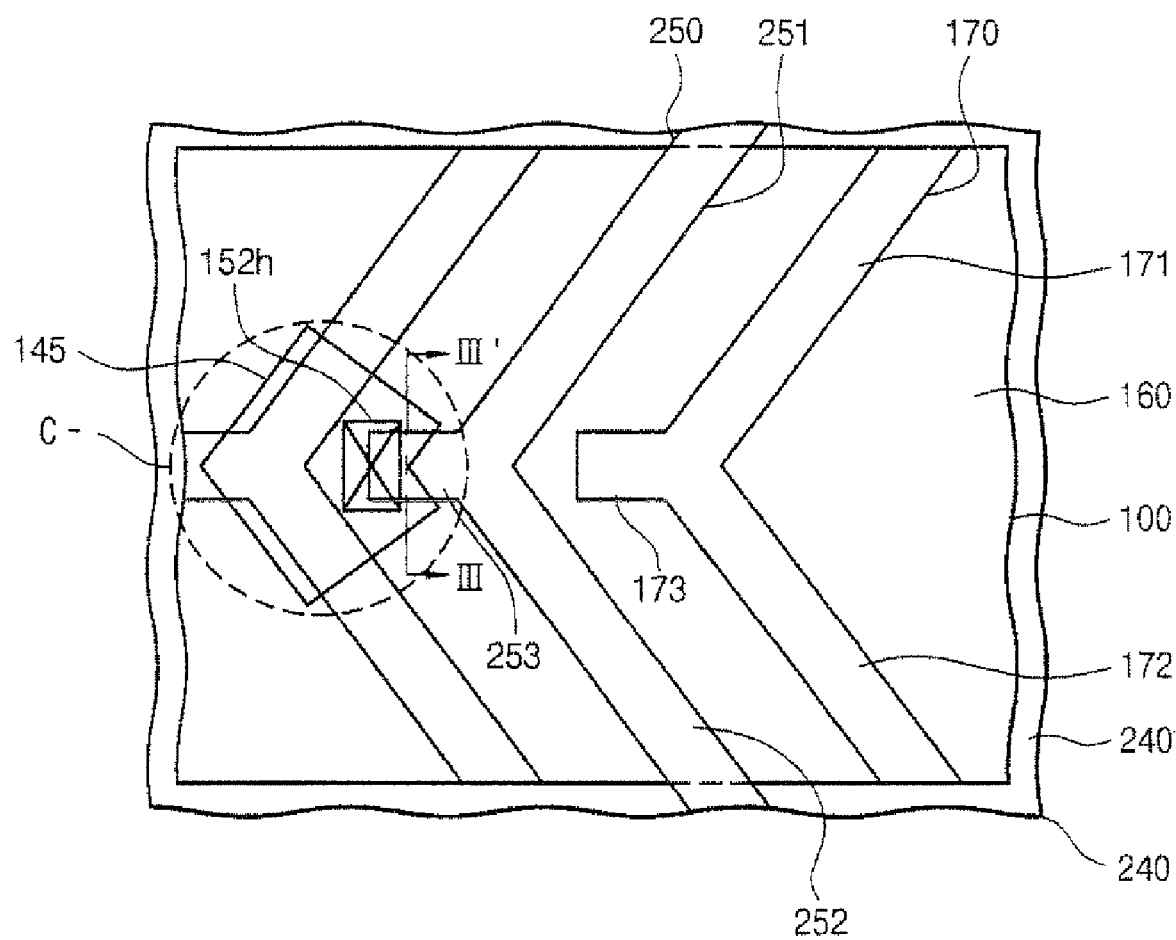
FIG. 4 shows a plan view of an LCD apparatus according to another exemplary embodiment of the present invention.
Figure 5:
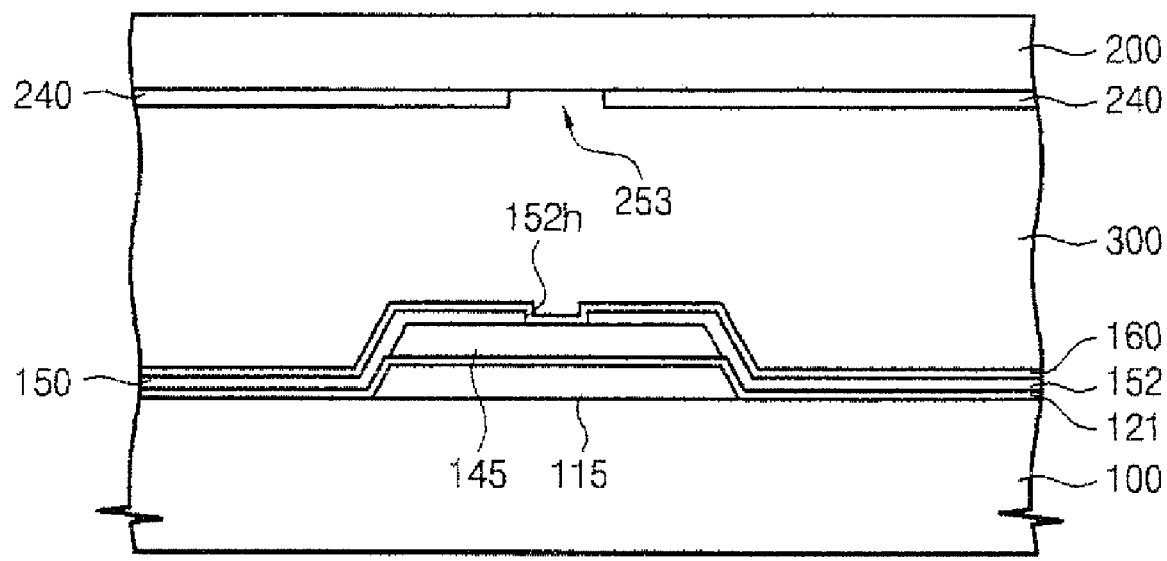
FIG. 5 shows a sectional view taken along line III-III' shown in FIG. 4.

FIG. 4 shows a plan view of an LCD apparatus according to another exemplary embodiment of the present invention. FIG. 5 shows a sectional view taken along line III-III' shown in FIG. 4. Description related to the elements identical to those of the prior embodiment will be omitted below in order to avoid redundancy.

Referring to FIG. 4, the LCD apparatus may include an upper substrate 200, a lower substrate 100, and a liquid crystal layer 300 interposed between the upper substrate 200 and the lower substrate 100. The upper substrate 200 may include a common electrode 240, and the lower substrate 100 may include a pixel electrode 160 and a storage capacitor C. The common electrode 240 may include an upper director 250 including a first cutting portion or a protrusion as described previously, and the pixel electrode 160 may include a lower director 170 including a second cutting portion or a protrusion. The upper director 250 may include the first upper director 251 and the second upper director 252. The upper director 250 may also include a third upper director 253, arranged at an obtuse angle relative to the first upper director 251 and the second upper director 252. The lower director 170 may include the first lower directors 171 and the second lower director 172. The lower director 170 may also include a third lower director 173, arranged at an obtuse angle relative to the first lower director 171 and the second lower director 172.

The third upper director 253 may extend from a point at which the first upper director 251 meets with the second upper director 252 along a symmetry axis of the first upper director 251 and the second upper director 252. When an electric field is applied, the first upper director 251 and the second upper director 252 may align liquid crystals in different directions. However, liquid crystals adjacent to the first upper director 251 and the second upper director 252 may be aligned randomly under the influence of both the first upper director 251 and the second upper director 252. In order to prevent the liquid crystals from being aligned randomly as described above, the third upper director 253 may be arranged adjacent to the first upper director 251 and the second upper director 252. Such a structure as described for the third upper director 253 may be substantially employed for the third lower director 173.

Referring to FIG. 5, the storage capacitor C and the pixel electrode 160 may be arranged on the lower substrate 100. The storage capacitor C may include the first storage electrode 115 and the second storage electrode 145, and a first insulating layer 121 may be interposed between the first storage electrode 115 and the second storage electrode 145, and a second insulating layer 152 may be arranged between the second storage electrode 145 and the pixel electrode 160. A contact hole 152h may be arranged through the second insulating layer 152 to expose the second storage electrode 145, and the pixel electrode 160 may be electrically coupled with the second storage electrode 145 through the contact hole 152h. The third upper director 253 may be arranged to correspond to the contact hole 152h.

If the storage capacitor C is arranged to correspond to the third upper director 253 as described above, the contact hole 152h may be arranged on the storage capacitor C such that the pixel electrode 160 can be disposed in the contact hole 152h. In contrast, the third lower director 173, which may be arranged as a cutting portion of the pixel electrode 160, may not be arranged in an area corresponding to the contact hole 152h in the lower substrate 100. Accordingly, when the contact hole 152h is included in the second insulating layer 152, the storage capacitor C may be arranged to correspond to the third upper director 253 and not the third lower director 173.

The storage capacitor C may include surfaces as described above, and the arrangement of the storage capacitor C and its surfaces may be also as described above for substantially the same reasons. As with the second surface $f_2$ described above, a surface of the storage capacitor C may be arranged substantially parallel to and proximate to the left side of the second lower director 172. As with the first surface $f_1$ described above, a surface of the storage capacitor C may be arranged substantially parallel to and proximate to the left side of the first lower director 171. As with the third surface $f_3$ described above, a surface of the storage capacitor C may be arranged substantially parallel to and proximate to the left side of the first upper director 251. As with the fourth surface $f_4$ described above, a surface of the storage capacitor C may be arranged substantially parallel to and proximate to the left side of the second upper director 252.

Since liquid crystals arranged proximate to the third upper director 253 may be aligned randomly under the influence of both the first upper director 251 and the second upper director 252 when the electric field is applied, these liquid crystals may be pre-tilted in a predetermined alignment by the surfaces of the storage capacitor C. Similarly, since liquid crystals arranged proximate to the third lower director 173 may be aligned randomly under the influence of both the first lower director 171 and the second lower director 172 when the electric field is applied, these liquid crystals may be pre-tilted in a predetermined alignment by the surfaces of the storage capacitor C. This may prevent the hindrance of liquid crystals from aligning into the predetermined alignment. Additionally, pre-tilting the liquid crystals may increase an operation time of the LCD apparatus.

Figure 6:
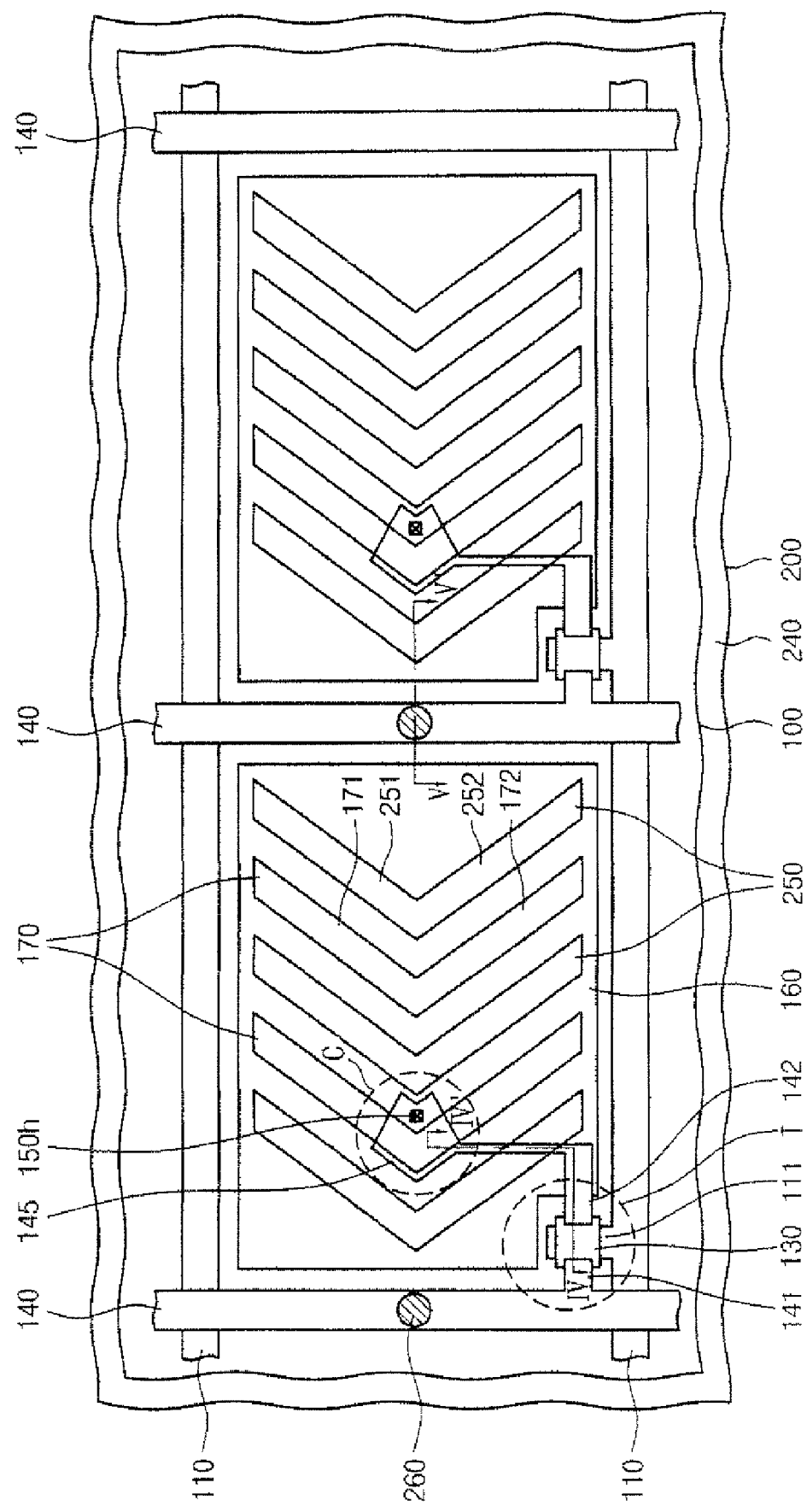
FIG. 6 shows a plan view of an LCD apparatus according to another exemplary embodiment of the present invention.
Figure 7A:
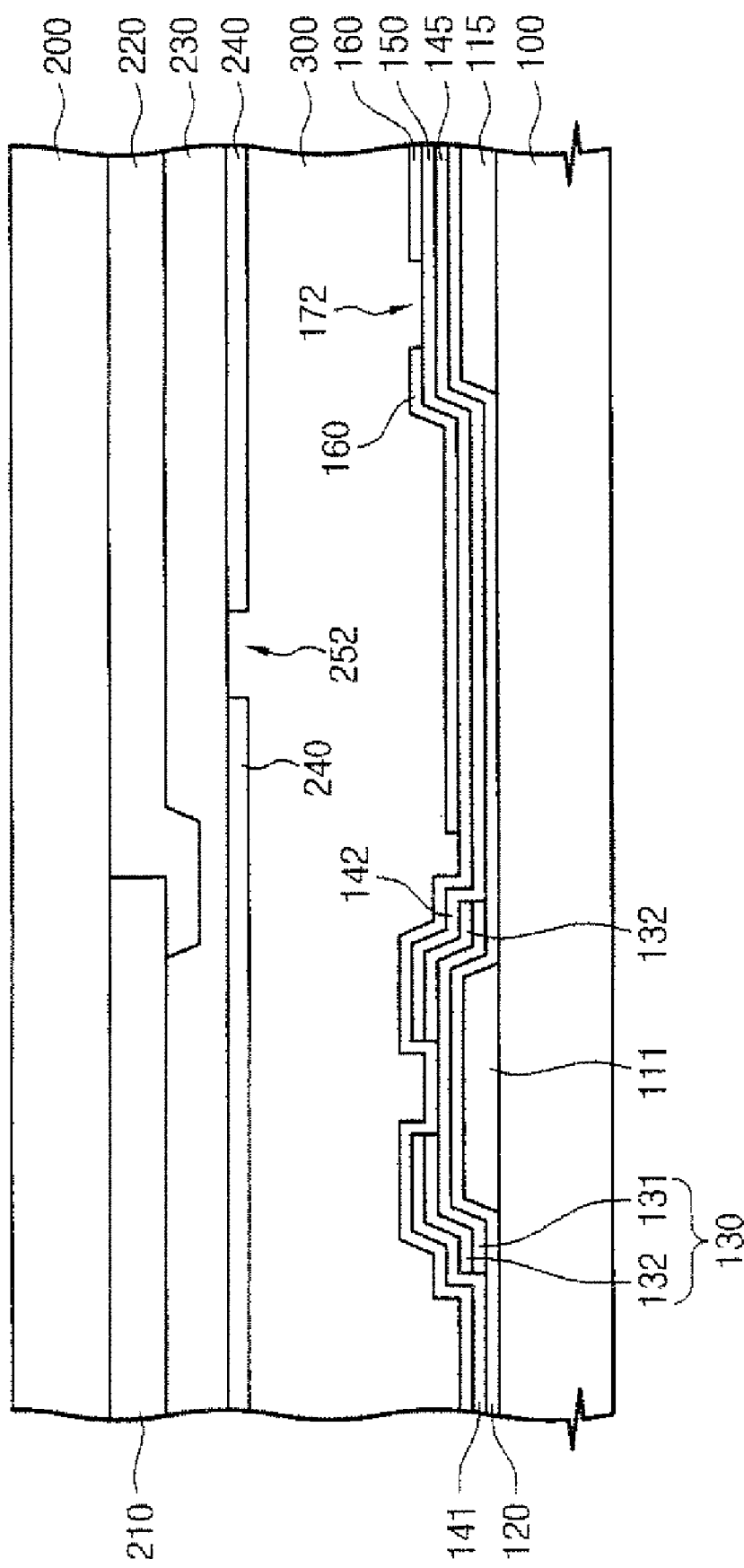
FIG. 7A shows a sectional view taken along line IV-IV' shown in FIG. 6.
Figure 7B:
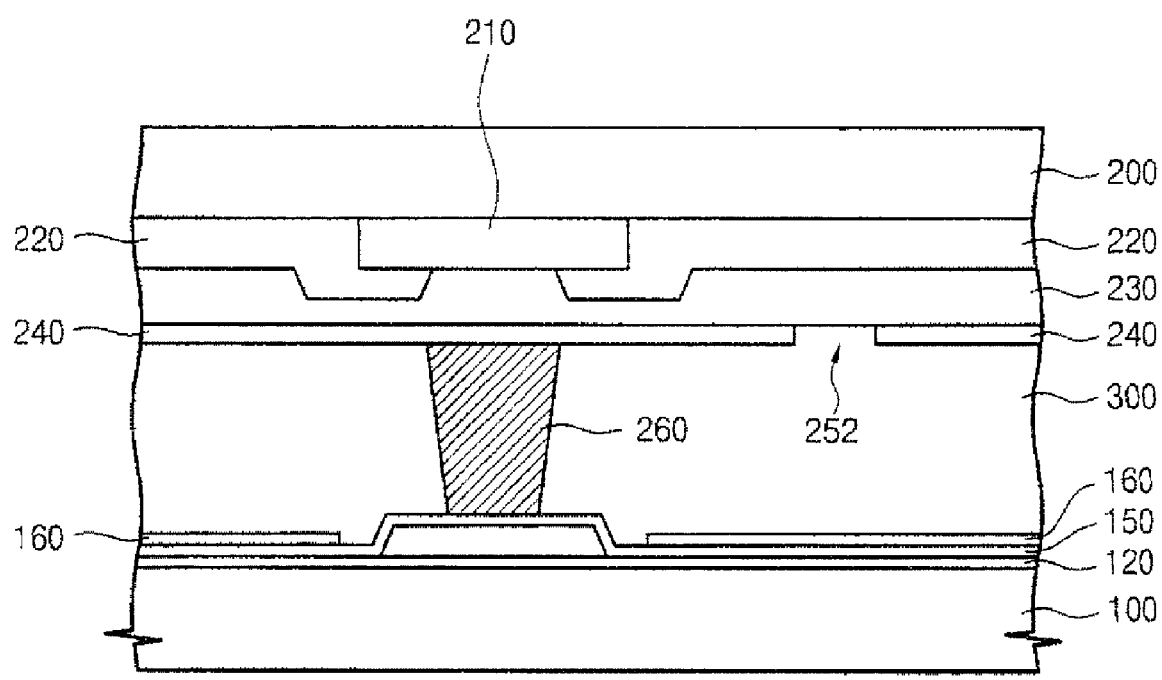
FIG. 7B shows a sectional view taken along line V-V' shown in FIG. 6.

FIG. 6 shows a plan view of an LCD apparatus according to another exemplary embodiment of the present invention. FIG. 7A shows a sectional view taken along line IV-IV' shown in FIG. 6. FIG. 7B shows a sectional view taken along line V-V' shown in FIG. 6. Description related to the elements identical to those of the prior embodiment will be omitted below in order to avoid redundancy.

Referring to FIG. 6, FIG. 7A, and FIG. 7B, the LCD apparatus may include an upper substrate 200, a lower substrate 100, a liquid crystal layer 300 interposed between the upper substrate 200 and the lower substrate 100. Gate lines 110 and data lines 140 may be arranged on the lower substrate 100 and may cross with each other to define a plurality of pixel areas therebetween. Each pixel area may include a thin film transistor T, a storage capacitor C, and a pixel electrode 160.

The thin film transistor T may include a gate electrode 111 extending from a gate line 110, a semiconductor pattern 130 arranged on the gate electrode 111, a source electrode 141 arranged on the semiconductor pattern 130 and extending from a data line 140, and a drain electrode 142 arranged opposite to the source electrode 141.

A gate insulating layer 120 may be arranged on the lower substrate 100 and between the gate electrode 111 and the semiconductor pattern 130. The semiconductor pattern 130 may include an active pattern 131 in which a channel of the thin film transistor T is formed and ohmic contact patterns 132. There may be two ohmic contact patterns 132 separated from each other. A first ohmic contact pattern 132 may contact the source electrode 141 and a second ohmic contact pattern 132 may contact the drain electrode 142.

The storage capacitor C may include the first storage electrode 115 and the second storage electrode 145 coupled with the drain electrode 142. A gate insulating layer 120 may be arranged between the first storage electrode 115 and the second storage electrode 145.

The storage capacitor C may include surfaces as described above, and the arrangement of the storage capacitor C and its surfaces may be also as described above for substantially the same reasons. As with the second surface $f_2$ described above, a surface of the storage capacitor C may be arranged substantially parallel to and proximate to the left side of the second lower director 172. As with the first surface $f_1$ described above, a surface of the storage capacitor C may be arranged substantially parallel to and proximate to the left side of the first lower director 171. As with the third surface $f_3$ described above, a surface of the storage capacitor C may be arranged substantially parallel to and proximate to the left side of the first upper director 251. As with the fourth surface $f_4$ described above, a surface of the storage capacitor C may be arranged substantially parallel to and proximate to the left side of the second upper director 252.

Since liquid crystals arranged proximate to the second point may be aligned randomly under the influence of both the first upper director 251 and the second upper director 252 when the electric field is applied, these liquid crystals may be pre-tilted in a predetermined alignment by the surfaces of the storage capacitor C. Similarly, since liquid crystals arranged proximate to the first point may be aligned randomly under the influence of both the first lower director 171 and the second lower director 172 when the electric field is applied, these liquid crystals may be pre-tilted in a predetermined alignment by the surfaces of the storage capacitor C. This may prevent the hindrance of liquid crystals from aligning into the predetermined alignment. Additionally, pre-tilting the liquid crystals may increase an operation time of the LCD apparatus.

The pixel electrode 160 may be arranged on the storage capacitor C, and may be insulated from the storage capacitor C by a protection film 150. A contact hole 150h may be arranged in the protection film 150 to expose the second storage electrode 145, and the second storage electrode 145 may be electrically coupled with the pixel electrode 160 through the contact hole 150h. The pixel electrode 160 may include a lower director 170 having the first lower director 171 and the second lower director 172, and the storage capacitor C may be arranged to correspond to the second lower director 172.

The upper substrate 200 may include a light blocking pattern 210 arranged along a border of the pixel area and a color filter 220 arranged in the pixel area. The light blocking pattern 210 may block light from passing through an area of the upper substrate 200 outside the pixel area. The color filter 220 may be a red light filter, a green light filter, or a blue light filter, and a color image may be displayed on the LCD apparatus through the combination of the three colors of the color filters 220 in a plurality of pixel areas. An overcoat layer 230 may be arranged under the light blocking pattern 210 and the color filter 220. The overcoat layer 230 may planarize a surface of the upper substrate 200 and may also protect the color filter 220. A common electrode 240 may be arranged under the overcoat layer 230, and the common electrode 240 may include an upper director 250 as described above.

The common electrode 240 may include a spacer 260 which contacts a surface of the lower substrate 100. The spacer 260 may maintain a predetermined distance between the upper substrate 200 and the lower substrate 100. The spacer 260 may include opaque insulating material and may be arranged an area of the LCD apparatus where light does not pass through such that an aperture ratio is not lowered due to the spacer 260. For example, the spacer 260 may be arranged outside the pixel area.

The area where light does not pass through may include an area of the LCD apparatus corresponding to the gate line 110, the data line 140, the thin film transistor T, and the storage capacitor C. The gate line 110, the gate electrode 111, and the first storage electrode 115 may be formed substantially simultaneously by depositing and then patterning a gate conductive layer on the lower substrate 100. Similarly, the data line 140, the source electrode 141, the drain electrode 142, and the second storage electrode 145 may be formed substantially simultaneously by depositing and then patterning a data conductive layer. The gate conductive layer and the data conductive layer may be manufactured by a metal material such as chrome to block out light, or such as aluminum alloy to reflect light such that light does not pass through areas of the gate line 110, the data line 140, the thin film transistor T, and the storage capacitor C.

Thus, the spacer 260 may be arranged to correspond to the gate line 110, the data line 140, or the thin film transistor T. However, if the spacer 260 is larger than the second storage electrode 145, since alignment directions of liquid crystals may be changed due to an external contour of the spacer 260, it may be desired to arrange the spacer 260 away from the storage capacitor C.

Figure 8:
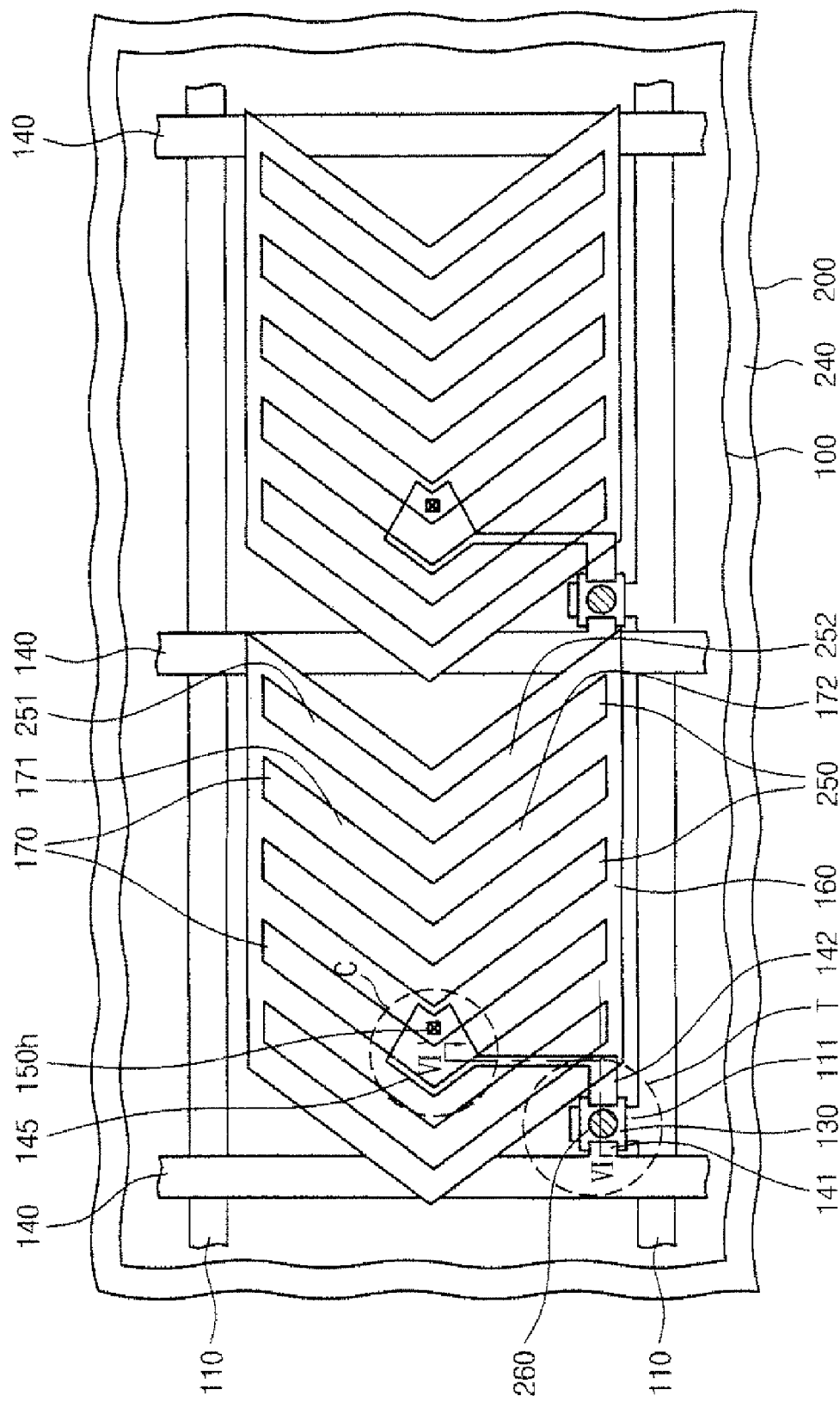
FIG. 8 shows a plan view of an LCD apparatus according to another exemplary embodiment of the present invention.
Figure 9:
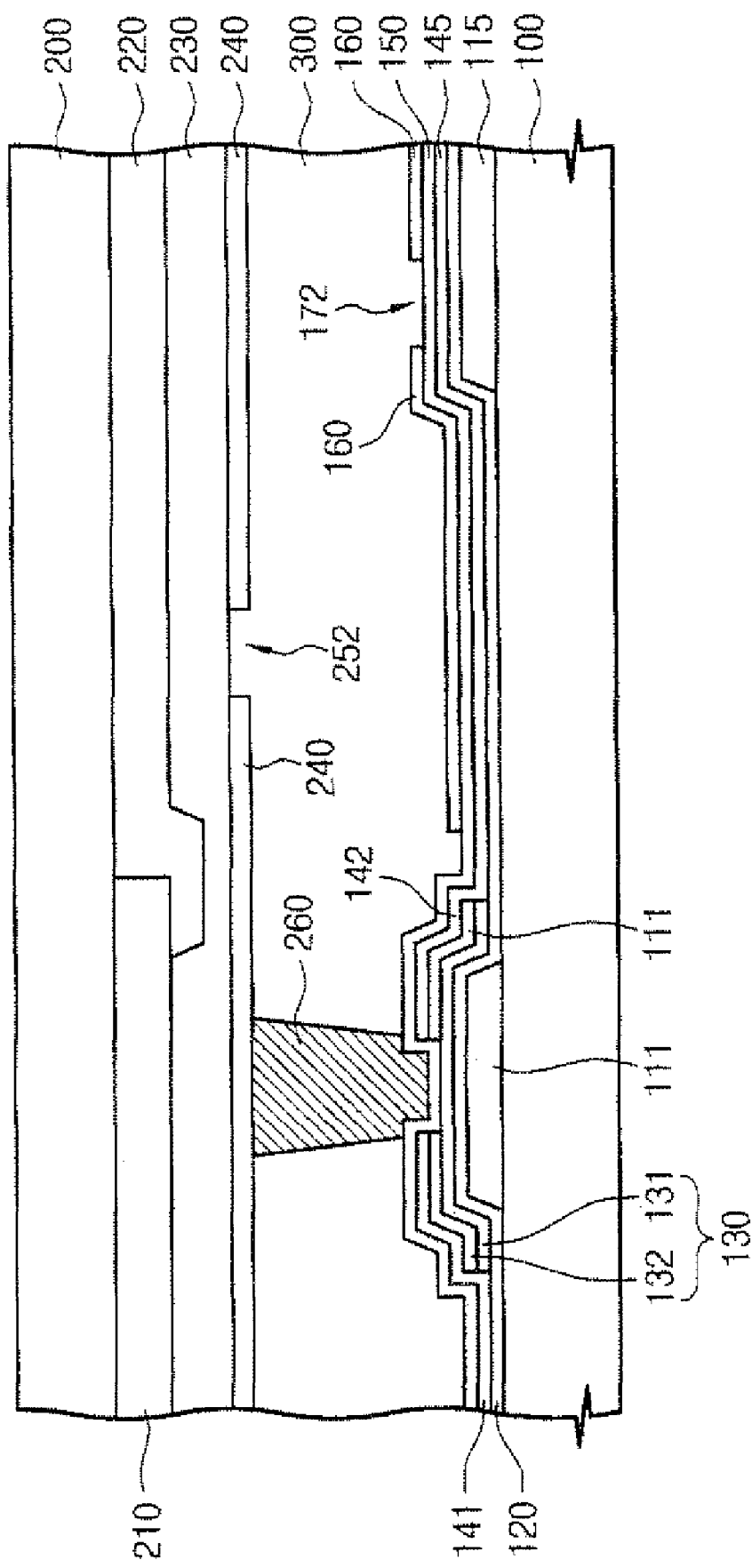
FIG. 9 shows a sectional view taken along line VI-VI' shown in FIG. 8.

FIG. 8 shows a plan view of an LCD apparatus according to another exemplary embodiment of the present invention. FIG. 9 shows a sectional view taken along line VI-VI' shown in FIG. 8. Description related to the elements identical to those of the prior embodiment will be omitted below in order to avoid redundancy.

Referring to FIG. 8 and FIG. 9, the LCD apparatus may include an upper substrate 200, a lower substrate 100, and a liquid crystal 300 interposed between the upper substrate 200 and the lower substrate 100. Gate lines 110 and data lines 140 may be arranged to cross with each other on the lower substrate 100. A thin film transistor T, a storage capacitor C, and a pixel electrode 160 may be arranged in pixel areas defined by the gate lines 110 and the data lines 140. The thin film transistor T may be coupled with the storage capacitor C, and the storage capacitor C may be coupled with the pixel electrode 160. The pixel electrode 160 may include a lower director 170 having the first lower director 171 and the second lower director 172. The upper substrate 200 may include the common electrode 240 formed thereon, and the common electrode 240 may include an upper director 250.

An upper edge and a lower edge of the pixel electrode 160 may be arranged substantially parallel to the gate lines 110, and a left edge and a right edge of the pixel electrode 160 may be arranged substantially parallel to the lower director 170. More specifically, an upper left edge and an upper right edge of the pixel electrode 160 may be arranged substantially parallel to the first lower director 171, and a lower left edge and a lower right edge of the pixel electrode 160 may be arranged substantially parallel to the second lower director 172. A portion of the pixel electrode 160 that is substantially parallel to the lower director 170 may also perform the function of the lower director 170. That is, the portion of the pixel electrode 160 that is substantially parallel to the lower director 170 may widen a viewing angle by aligning the liquid crystals in a specific direction.

The storage capacitor C may include surfaces as described above, and the arrangement of the storage capacitor C and its surfaces may be also as described above for substantially the same reasons. As with the second surface $f_2$ described above, a surface of the storage capacitor C may be arranged substantially parallel to and proximate to the left side of the second lower director 172. As with the first surface $f_1$ described above, a surface of the storage capacitor C may be arranged substantially parallel to and proximate to the left side of the first lower director 171. As with the third surface $f_3$ described above, a surface of the storage capacitor C may be arranged substantially parallel to and proximate to the left side of the first upper director 251. As with the fourth surface $f_4$ described above, a surface of the storage capacitor C may be arranged substantially parallel to and proximate to the left side of the second upper director 252.

Since liquid crystals arranged proximate to the second point may be aligned randomly under the influence of both the first upper director 251 and the second upper director 252 when the electric field is applied, these liquid crystals may be pre-tilted in a predetermined alignment by the surfaces of the storage capacitor C. Similarly, since liquid crystals arranged proximate to the first point may be aligned randomly under the influence of both the first lower director 171 and the second lower director 172 when the electric field is applied, these liquid crystals may be pre-tilted in a predetermined alignment by the surfaces of the storage capacitor C. This may prevent the hindrance of liquid crystals from aligning into the predetermined alignment. Additionally, pre-tilting the liquid crystals may increase an operation time of the LCD apparatus.

According to the LCD apparatus, when an electric field is applied to the liquid crystals, liquid crystals aligned along the external contour are more quickly aligned in a predetermined direction according to the influence of the upper director 250 and the lower director 170. Thus, the LCD apparatus may have a wide viewing angle and an improved operation speed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) apparatus, comprising:
   an upper substrate and a lower substrate opposing each other;
   a liquid crystal layer arranged between the upper substrate and the lower substrate;
   a storage capacitor arranged on the lower substrate and comprising a first storage electrode and a second storage electrode;
   a pixel electrode arranged on the second storage electrode and comprising a lower director having a first lower director coupled with a second lower director; and
   a common electrode arranged on the upper substrate and comprising an upper director having a first upper director coupled with a second upper director,
   wherein the second storage electrode comprises at least two surfaces arranged substantially orthogonal to the first lower director and the second lower director, respectively.

2. The LCD apparatus of claim 1, wherein the second storage electrode is arranged symmetrically about a virtual line passing through a first point defined where the first lower director meets with the second lower director and a second point defined where the first upper director meets with the second upper director, and the second storage electrode extends substantially parallel to the first lower director and the second lower director.

3. The LCD apparatus of claim 2, wherein the second storage electrode comprises:
   a first surface arranged substantially parallel to the first lower director;
   a second surface arranged substantially parallel to the second lower director;
   a third surface arranged substantially parallel to the first upper director;
   a fourth surface arranged substantially parallel to the second upper director;
   a fifth surface coupled between the first surface and the third surface; and
   a sixth surface coupled between the second surface and the fourth surface,
   wherein the first surface is arranged substantially parallel to the third surface and substantially orthogonal to the fifth surface, and the second surface is arranged substantially parallel to the fourth surface and substantially orthogonal to the sixth surface.

4. The LCD apparatus of claim 2, wherein the first lower director is arranged between the first upper director and the first surface, and is substantially adjacent to the first surface, and the second lower director is arranged between the second upper director and the second surface, and is substantially adjacent to the second surface.

5. The LCD apparatus of claim 3, wherein the third surface is arranged between the first upper director and the first lower director, and is substantially adjacent to the first upper director, and the fourth surface is arranged between the second upper director and the second lower director, and is substantially adjacent to the second upper director.

6. The LCD apparatus of claim 1, wherein the first storage electrode and the second storage electrodes have a substantially similar size and substantially similar shape.

7. The LCD apparatus of claim 1, wherein the second storage electrode is arranged on the first storage electrode, and completely covers the first storage electrode.

8. The LCD apparatus of claim 1, further comprising:
   a third lower director arranged where the first lower director meets with the second lower director, the third lower director extending substantially parallel to the virtual line at an obtuse angle relative to the first lower director and the second lower director.

9. The LCD apparatus of claim 1, further comprising:
   a third upper director arranged where the first upper director meets with the second upper director, the third upper director extending substantially parallel to the virtual line at an obtuse angle relative to the first upper director and the second upper director.

10. The LCD apparatus of claim 9, wherein the storage capacitor overlaps with the third upper director.

11. The LCD apparatus of claim 1, further comprising:
    a gate line and a data line arranged on the lower substrate to cross with each other;
    a gate electrode coupled with the gate line;
    a source electrode coupled with the data line; and
    a drain electrode coupled with the second storage electrode.

12. The LCD apparatus of claim 11, further comprising:
an insulating layer arranged between the storage capacitor and the pixel electrode.

13. The LCD apparatus of claim 12, wherein the insulating layer includes a contact hole through which the pixel electrode is electrically coupled with the second storage electrode.

14. The LCD apparatus of claim 11, further comprising:
a spacer arranged between the upper substrate and the lower substrate, and overlaps with one of the gate line, the gate electrode, and the data line.

15. The LCD apparatus of claim 11, wherein the pixel electrode is arranged substantially parallel to the gate line and the data line.

16. The LCD apparatus of claim 11, wherein the pixel electrode is arranged substantially parallel to the gate line and the lower director.

17. The LCD apparatus of claim 1, wherein the upper director comprises a first cutting portion in the common electrode and the lower director comprises a second cutting portion in the pixel electrode.

18. The LCD apparatus of claim 1, wherein the upper director comprises a protrusion arranged on the common electrode, and the lower director comprises a cutting portion in the pixel area.

* * * * *